Figure 1:
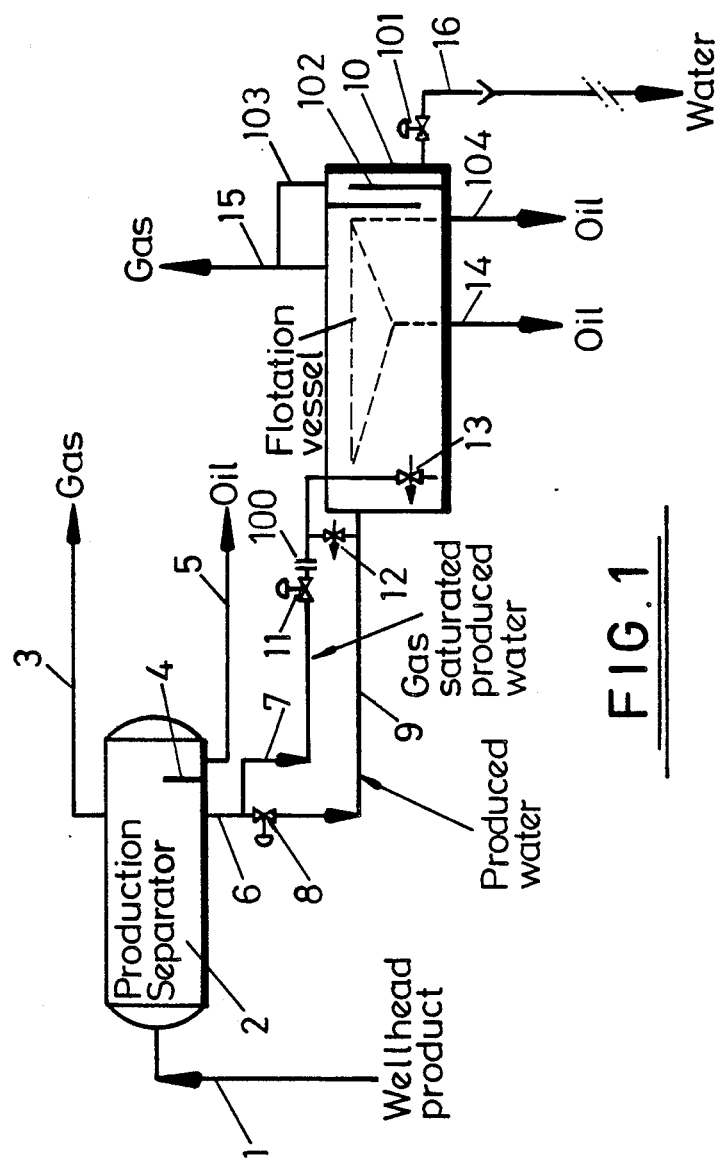

United States Patent [19]

Rockford et al.

[11] Patent Number: 4,889,638
[45] Date of Patent: Dec. 26, 1989

[54] AGITATION AND/OR GAS SEPARATION AND DISPERSED GAS FLOTATION

[75] Inventors: David B. Rockford, Ellon; William H. Sutton; Christopher R. Bond, both of Aberdeen; Brian Wilkinson, Methlick, all of Scotland

[73] Assignee: Britoil PLC, Glasgow, Scotland

[21] Appl. No.: 232,565

[22] Filed: Aug. 12, 1988

Related U.S. Application Data

[63] Continuation of Ser. No. 875,162, Jun. 17, 1986, abandoned.

[30] Foreign Application Priority Data

Jun. 19, 1985 [GB] United Kingdom ............... 8515454

[51] Int. Cl.4 ........................................ B01D 17/035
[52] U.S. Cl. ................................ 210/703; 210/706; 210/790; 210/218; 210/221.2
[58] Field of Search ............... 210/702, 703, 704, 706, 210/218, 221.1, 221.2, 707, 708, 790, 705; 209/164, 170

[56] References Cited

U.S. PATENT DOCUMENTS

| | | | |
|---|---|---|---|
| 3,446,488 | 5/1969 | Mail et al. | 210/221.2 |
| 3,623,608 | 11/1971 | Waterman | 210/221.2 |
| 3,725,264 | 4/1973 | Wheeler | 210/704 |
| 3,884,803 | 5/1975 | Traylor | 210/704 |
| 4,069,149 | 1/1978 | Jackson | 210/221.2 |
| 4,108,768 | 8/1978 | Sebelik et al. | 210/705 |
| 4,395,337 | 7/1983 | Ciepiela | 210/703 |
| 4,492,636 | 1/1985 | Burke | 210/706 |
| 4,552,651 | 11/1985 | Sandbrook et al. | 209/164 |
| 4,563,283 | 1/1986 | Nicksic | 210/703 |
| 4,627,922 | 12/1986 | Viator et al. | 210/706 |
| 4,752,399 | 6/1988 | Viator et al. | 210/704 |
| 4,790,944 | 12/1988 | Gordon et al. | 210/706 |

FOREIGN PATENT DOCUMENTS 2079618 1/1982 United Kingdom .

Primary Examiner—Peter Hruskoci
Assistant Examiner—Christopher Upton
Attorney, Agent, or Firm—Pennie & Edmonds

[57] ABSTRACT

A method of, and apparatus for, separating phases in a polyphase system is described and particularly in separating oil from produced water by the contact of gas bubbles and oil droplets by a dispersed gas flotation technique. A polyphase system is divided into at least two portions. The pressure of one portion is reduced to form bubbles of a gas, and the two portions are then recombined whereby the bubbles in the mixture enhances flotation, and hence separation of the dispersed phase, e.g. oil, from the continuous phase, e.g. water. The invention has particular application in the oil industry and in other fields where efficient separation is required.

16 Claims, 2 Drawing Sheets

4,889,638

AGITATION AND/OR GAS SEPARATION AND DISPERSED GAS FLOTATION

This is a continuation of application Ser. No. 875,162, filed June 17, 1986, now abandoned.

The present invention relates to a method of and an apparatus for use in reducing the oil-content of produced water by a flotation technique.

In this description and in the appended claims, the expression "produced water" means a mixture of oil and water having a gas in solution under relatively high pressure. Production water is, typically, a component of well head product obtained in a first stage or production separator in the course of oil production in the petroleum industry.

It is known that a dissolved gas flotation technique can be applied to the recovery of fibres and white water from effluent in the paper industry. This technique is based on the generation of very small diameter air bubbles which aid separation.

Such a technique has hitherto been used to treat produced water drawn from a first stage or production separator used for bulk separation of crude oil, gas and produced water when fed directly with fluid from a well head. However, the dissolved gas flotation technique is characterized by very small gas bubbles having relatively low rise velocities which means that separation by flotation of oil droplets is slow. Thus, dissolved gas flotation units have to be large because of the low rise velocities of the combined oil droplets and gas bubbles. Also, substantial power consumption is required for gas saturation in the liquid phase and the process plant involved has the complication of control equipment to control levels in a saturation vessel. Further, safety equipment is required to protect the saturation vessel from fire hazard and over-pressure criteria.

It is also known that an induced gas flotation technique can be applied for the separation of oil from oily waters in the petroleum industry. This technique is based on the generation of relatively large gas bubbles which aid oil in water separation.

However, the large gas bubble diameters produced by this technique lead to lower oil clean-up efficiencies. Also, significant power is required by a pumping system for promoting gas entrainment for subsequent gas breakout.

SUMMARY OF THE INVENTION

According to a first aspect of the invention, there is provided a method for the gas flotation treatment of a mixture including oil and water to reduce the oil content of the water, the mixture being continuously produced under a relatively high pressure and having a gas in solution, in which method the mixture is carried from a first vessel at said relatively high pressure in first pipe means to a flotation vessel at a relatively low pressure by way of first controllable pressure letdown means arranged in the first pipe means, and the first controllable pressure letdown means is selectively operated to transfer mixture from said first vessel to said flotation vessel according to a rate of production of said mixture, the improvement comprising the steps of:
providing second pipe means having second controllable pressure letdown means, said second pipe means extending from an influent location upstream of the first controllable pressure letdown means to a discharge location, and
selectively operating said second controllable pressure letdown means to establish at said discharge location a flow of mixture laden with bubbles of gas released from solution and caused by cavitation for gas flotation treatment of mixture in the flotation vessel.

According to a second aspect of the invention, there is provided a method for the treatment of produced water (as hereinbefore defined) to reduce the oil content thereof, comprising the steps of dividing the produced water into first and second portions, modifying the first portion by reducing the pressure thereof in a single stage, delivering the modified first portion to a flotation vessel, modifying the said second portion by reducing the pressure thereof to effect a controlled formation of gas bubbles therein of a desired mean size, said gas bubbles being released from solution and caused by cavitation, and injecting the modified second portion into the flotation tank to effect gas flotation treatment of the combined first and second modified portions.

According to a third aspect of the invention, there is provided apparatus for use in the treatment of produced water (as hereinbefore defined) to reduce the oil content thereof, comprising a first vessel for holding produced water under relatively high pressure, a flotation vessel, first pipe means, second pipe means extending between the first vessel and the flotation vessel, first controllable pressure letdown means arranged in said first pipe means extending from an influent location upstream of said first controllable pressure letdown means to a discharge location, and second controllable pressure letdown means arranged in said second pipe means.

It has been found that a more controlled and varied gas (any gas with suitable solubility characteristics) bubble diameter distribution can be attained by means of the present invention without the requirement for gas saturation vessels, excess degassers, control equipment, pump recirculation systems, and piping, which are prerequisites of induced and dissolved gas generation techniques.

In a preferred application of the invention to the petroleum industry, the saturation of the produced water which acts as the motive fluid containing the gas available for flotation, is an inherent characteristic of wellhead fluid from certain oil reservoirs prior to pressure letdown to atmospheric conditions. Accordingly, for such wells the produced water in a production separator operated at an elevated pressure above atmospheric conditions is, by definition, supersaturated compared to normal atmospheric pressure. Therefore, by routing a portion of the produced water from a production separator for injection to a flotation vessel, a ready source of gas is available.

The portion constituting the injection flow used as compared to the total flow rate of oily water to be cleaned up depends on a number of parameters. These relate to separator operating pressure, influent concentration of oil in water, and control of the gas evolution rate below that rate causing a slug flow regime due to excess gas bubble coalescence.

The second controllable letdown means may be selectively operable to generate bubbles within the mixture flow in a multi-stage operation. For example, in a first stage, primary letdown of pressure relatively large bubbles by partial gas breakout from solution. In a second stage, these first stage bubbles are reduced in size by being sheared through a shearing device such as a diffuser plate ie a multiple orifice plate assembly. In a third or final stage, full letdown of pressure is performed and this releases a further quantity of dissolved gas which will break out of solution sufficient violence to produce cavitation, thus further reducing by turbulence the size of the bubbles from the second stage. However, the pressure letdown at the third or final stage may also be controlled through nozzles so that a useful fraction of the bubble size distribution is equal to or larger than that normally found in dissolved gas flotation techniques so the second stage, involving shearing, may be omitted.

It is thus possible to produce a gas bubble size distribution as required by varying the staged letdown pressures to allow a wide range of oily water flows and concentrations to be treated. Cleaned effluent may therefore be produced for discharge, for instance, to the sea from an off-shore oil, condensate or gas production platform with the effluent meeting statutory and other regulations concerning hydrocarbon contamination levels.

It is also possible to provide apparatus requiring reduced capital expenditure by the elimination of any recirculation system as employed for induced or disssolved gas flotation systems. This leads to reduced maintenance and increased activity of operation by increasing the mean time between failures. Greater flexibility of operation is possible due to greater permissible variations in flowrates. Also, a smaller flotation vessel may be used since there is no need for hydraulic loading imposed by recirculation flowrate. In comparison with previously known techniques, there are no energy related operating costs for generating the gas bubbles.

Figure 2:
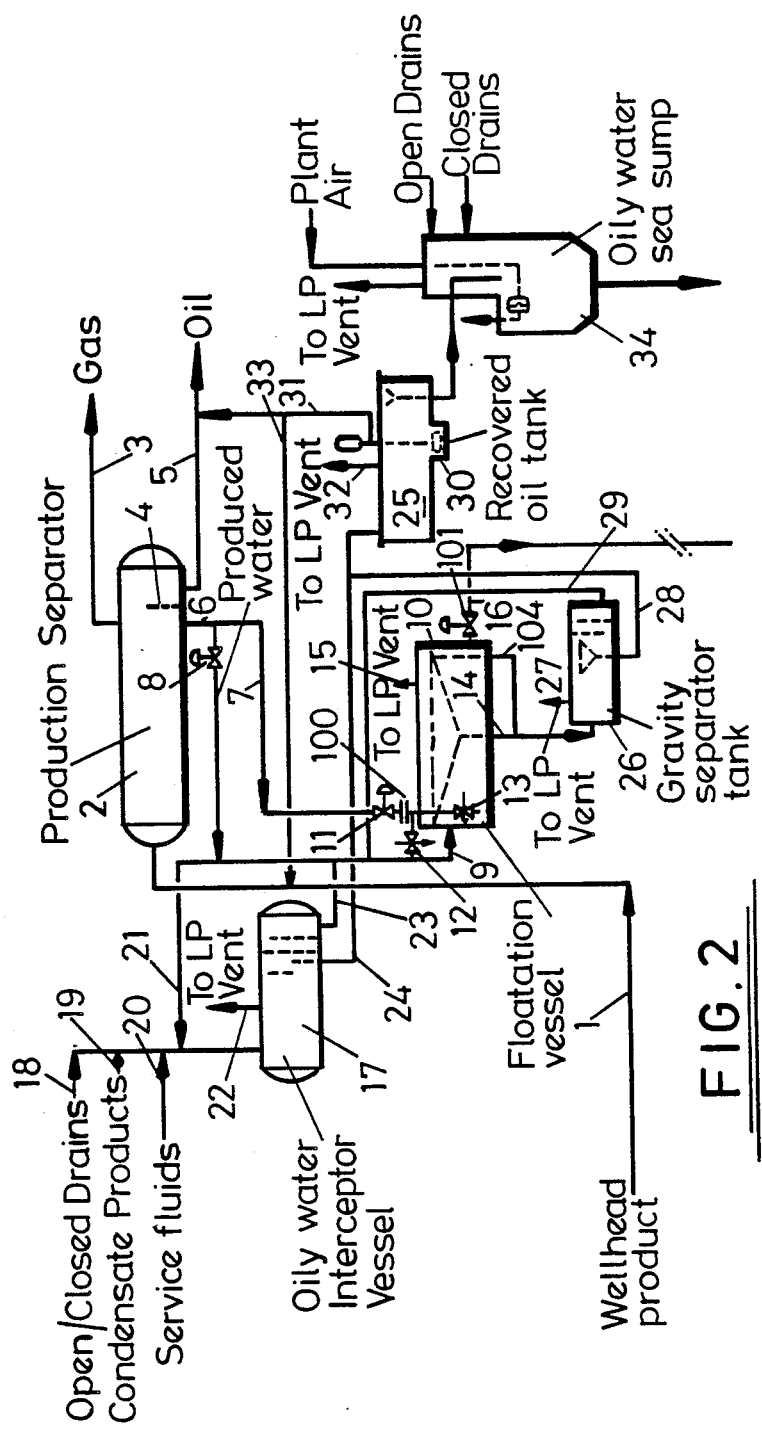

Embodiments of the invention will be now described, by way of example, with reference to the accompanying drawings, in which:

FIG. 1 is a schematic diagram of an apparatus constituting one embodiment of the invention; and FIG. 2 is a schematic diagram of a well-head installation incorporating the apparatus of FIG. 1.

The apparatus in FIG. 1 is for use in the petroleum industry for bulk separation of crude oil from water and gas at a wellhead, and subsequent clean-up of the produced water. The apparatus is intended for use on an off-shore production platform, but is generally suitable for use in on-shore applications also.

The apparatus comprises a pipe 1 which supplies wellhead product in the form of a fluid or mixture to a first vessel in the form of a production separator 2. The production separator operates at elevated pressure and allows the product to be separated into the three components. A gas component comprising "natural gas" is given off and is removed via a pipe 3, for storage or supply to a pipeline or for burning off as a gas flare if the gas cannot be economically used. The production separator 2 contains a baffle 4 forming a weir over which a substantial proportion of the oil in the wellhead product flows. The oil is removed via a pipe 5 for storage or to a pipeline. The liquid part of the wellhead product in the production separator is sufficiently still to permit a substantial proportion of the desired oil components to float to the surface of the oil and water mixture and the level within the separator 2 is controlled so that oily water flow over the baffle 4 is minimized.

This oily water, hereinbefore defined as produced water, is withdrawn from the separator 2 via a pipe 6 and is then split into two portions. An injection flow portion flows along a pipe 7 at a rate which may be between one and fifty percent of the flow rate in the pipe 6. The other portion, comprising the remainder of the produced water, is supplied to a first controllable letdown means in the form of a level control valve 8 and thence via a pipe 9 to a flotation vessel 10. The valve 8 is operable in a single step of pressure letdown so as to control the level of the oil and water interface in the production separator 2 according to production rate. The vessel 10 operates at substantially wellhead temperature and marginally above atmospheric pressure and the pressure of the said other portion is let down by the valve 8 in such a way that stable control of separator interface level results.

The injection flow portion of the produced water in the pipe 7 is saturated, at the operating pressure of the production separator 2, with gas and hence is supersaturated with respect to atmospheric pressure. This portion is supplied to a primary pressure letdown valve 11 in which the letdown of pressure induces relatively large bubbles as part of the gas breaks out of solution. The produced water with the entrained bubbles is then supplied via a shearing device 100, for instance in the form of a diffuser plate comprising a multiple orifice plate assembly, to final pressure letdown valves 12 and 13, which may be combined or provided independently. The valve 12 provides a full flow bypass route for indirect injection of the injection flow portion of pipe 7 into the main fluid stream in pipe 9. The bypass line incorporating the valve 12 enhances maintenance access and can allow the size of the vessel 10 to be reduced even further.

The primary letdown of pressure, for instance from 5 Barg to 2.5 Barg, over the valve 11 causes the gas to break out of solution and be produced as relatively large bubbles. The shearing device 100 then reduces the size of these large bubbles caused, for instance, by 0.5 BARG pressure reduction producing smaller bubbles which, nevertheless, are still relatively large compared with the bubbles produced in a conventional dissolved gas flotation technique.

Following primary letdown of pressure, the injection flow portion of produced water is still saturated with gas in solution, but at a lower pressure. The valve 12 and/or 13 provides final letdown of pressure to liquid hydrostatic pressure within the vessel 10 and the injection flow portion of produced water is suppled (in the case of the valve 13 through nozzles) into a lower part of the vessel 10 well below the level of fluid in the vessel for the purpose of mixing the oil droplets and gas bubbles. Thus, a gas flotation effect occurs, but at a lower pressure than is usual in dissolved gas flotation systems. More of the gas breaks out of solution and cavitation occurs so bubbles are formed larger than those produced in the known dissolved gas flotation techinque since the pressure reduction over the valve 12 and/or 13 is relatively small. By appropriate control of the flowrate and pressure letdown between the valves 11 and 13, or 11 and 12, it is possible to adjust the size distribution of bubbles from both the primary and the final letdowns to achieve an optimum mean bubble size. By causing cavitation in final pressure letdown, bubble size can be reduced. These optimally-sized bubbles rise to the surface of liquid in the flotation vessel promoting separation of oil from water with an optimized rise velocity of the combined oil droplets and gas bubbles, that is, which is faster as compared with smaller bubble sizes usually associated with dissolved gas flotation, but slower as compared with larger bubble sizes associated with induced gas flotation.

The separated oil is removed from the vessel by a combination of a full vessel length oil offtake via a pipe 14, and by a notched weir via a pipe 104. A valve 101 is provided for controlling the level of liquid in the vessel 10. Low pressure gas from above the liquid level is removed via a pipe 15 and is either recovered, if economically viable, or is flared. Clean water is removed from a lower part of the vessel via a pipe 16 and is discharged, for instance to the sea. A vent pipe 103 is connected above weir 102 to pipe 15 to avoid pressure build up.

FIG. 2 illustrates use of the apparatus of FIG. 1 in an installation for an off-shore oil production platform. Like reference numerals refer to like parts and will not be described again.

The installation includes an oily water separator vessel 17 which receives oily water from drains via a pipe 18, condensate products via a pipe 19, and service fluids via a pipe 20. Also, produced water from the separator 2 can be supplied to the vessel 17 via a pipe 21.

The vessel 17 is provided with a pipe 22 which conducts gas from the vessel to a low pressure vent, either for recovery or for flaring. Oily water from the lower part of the vessel 17 is supplied via a pipe 23 and the pipe 9 to the flotation vessel 10 for cleaning. Oil from the upper levels of fluid in the vessel 17 is removed, for instance by a weir, and supplied via a pipe 24 to a recovered oil tank 25.

Oil, still partly contaminated with water, from the flotation vessel 10 is supplied via the pipe 14 to a gravity separator tank 26. The tank 26 is provided with a pipe 27 for removing gas to a low pressure vent. The fluid in the gravity separator tank 26 is retained for a time sufficient for further separation of oil from water and the upper layer of oil is removed, for instance by means of a weir, and supplied via a pipe 28 to the recovered oil tank 25. Oily water from the lower part of the tank 26 is removed and fed back via a pipe 29 and the pipe 9, into the flotation vessel 10 for further purification.

The recovered oil tank 25 is provided with a submerged pump 30 for supplying oil from the tank under pressure to a pipe 31. The recovered oil tank 25 is provided with a pipe 32 which conducts gas to a low pressure vent header for recovery or for flaring. The pressurised oil is then supplied to the pipe 5. If necessary, some of the recovered oil from the tank 30 may be fed back via a pipe 33 to the production separator 2.

An oily water sea sump 34 is provided for receiving fluid from the tank 25 typically in an upset condition and from various other sources. This sea sump is of conventional type and will not be described further.

In use, the production separator 2 receives wellhead fluid and performs three or four phase separation ie, oil, gas, produced water, and occasionally sand. The oil is present as a primary dispersion in the wellhead fluid and a substantial degree of separation is achieved in the separator 2. However, a secondary dispersion of oil remains in the produced water in the form of droplets having a diameter which is typically between 5 and 100 microns. Gravity separation techniques are not effective for the produced water because of the requirement for high residence times, thus requiring large vessels, which would be necessary in order for separation to take place. Such large vessels are impractical and uneconomic, especially for off-shore production platform environments.

The injection flow portion of produced water whose pressure is let down in the valves 11 and 13 and which passes through the diffuser plate immediately downstream of the valve 11 produces bubbles within the flotation vessel 10 having a bubble size or diameter range from 30 to 1000 microns. The range may be controlled by control of the valves 11 and 13 and the design of the diffuser plate so as to provide bubbles within a particularly desired range of diameters. The apparatus achieves bubble generation within the range of 0 to 20 percent by volume of gas at standard temperature and pressure (STP) of influent volume without the need of a recirculation system around the flotation vessel 10. This contrasts with the known induced gas flotation technique, which produces bubbles having a typical diameter range of 500 to 2000 microns but requires a recirculation rate of 25 to 100 percent relative to influent rate, and known dissolved gas flotation techniques which normally produced bubbles having a diameter range of 30 to 120 microns and require 5 to 10 percent recirculation.

The recovered oil from the flotation vessel is removed, for instance by a combination of notched weirs, fixed and variable level baffles or level control valves, and has a higher concentration than the produced water from the production separator 2. This recovered oil is supplied under gravity or pumped to the gravity separator tank 26 where the richer oil phase is readily separated as the flotation vessel, by means of the dispersed gas flotation, has already assisted in such separation by tending to convert secondary dispersions to that characterized as a primary dispersion. Thus, the oil droplet dispersions are typically close to or larger than diameters of 100 microns.

In one example of an apparatus and installation of the types shown in the drawings, the production separator 2 was operating with a throughput of over 620 cubic meters per hour, providing over 390 cubic meters per hour of crude oil, over 230 cubic meters per hour of produced water, and approximately 7.5 tonnes of gas for fuelling purposes. The influent oil in water concentration relative to total hydrocarbon was on average 100 milligrams per liter. The effluent oily water concentration was approximately 25 milligrams per liter together with a soluble content of approximately 10 milligrams per liter, which amounted to an overall oil removal efficiency for the apparatus of approximately 83 percent. Further, the contamination of the water flowing out of the flotation vessel was below current statutory limits of 40 milligrams per liter so that the water was suitable for discharge directly into the sea.

Experience has shown that produced water throughputs of greater than 130 cubic meters per hour using an induced gas system do not maintain the concentration of contamination in discharged water below the statutory limit of 40 milligrams per liter. Thus, it was not possible to increase the loading of induced gas flotation units. Also, it has been found that basic dissolved gas flotation systems operating at flow rates above 200 cubic meters per hour cannot maintain contamination below 40 milligrams per liter because of the inability of this system to deal with transient variations of concentrations of oil in water, as tends to occur in oil production.

The apparatus is thus capable of meeting present requirements concerning concentration of contaminants in water to be discharged, and can be adjusted to meet even more severe conditions if necessary. The apparatus represents a substantial simplification and saving in cost with respect to previously know flotation systems

We claim:

1. A method for the gas flotation treatment of a produced water mixture including oil and water to reduce the oil content of the water, the mixture being continuously produced under a relatively high pressure and having a gas naturally present in solution, said method comprising the steps of:
   carrying the mixture from a first vessel at said relatively high pressure in first pipe means to a flotation vessel at a relatively low pressure by way of first controllable pressure letdown means arranged in the first pipe means;
   selectively operating the first controllable pressure letdown means to transfer mixture from said first vessel to said flotation vessel according to a rate of production of said mixture;
   providing second pipe means having second controllable pressure letdown means, said second pipe means extending from an influent location upstream of the first controllable pressure letdown means to a discharge location in communication with the flotation vessel; and
   selectively operating said second controllable pressure letdown means to establish at said discharge location a flow of mixture laden with bubbles of said naturally present gas released from solution and caused by cavitation for gas flotation treatment of mixture in the flotation vessel.

2. The method claimed in claim 1, wherein the selective operation of the first and second controllable pressure letdown means is such that the mean flow rate of mixture in said second pipe means is between 1% and 50% of the mean flow rate in said first pipe means.

3. The method claimed in claim 2, wherein said second controllable pressure letdown means comprises multi-stage pressure letdown means.

4. The method claimed in claim 2, wherein said second controllable pressure letdown means comprises gas bubble shearing means.

5. The method claimed in claim 2, wherein the said step of selectively operating said second controllable pressure letdown means is a multi-stage operation, in which the mixture flow in said second pipe means is subjected upstream of the said discharge location to a primary pressure letdown to an intermediate pressure at which bubbles form in the mixture due to said naturally present gas breaking from solution, and at said discharge location the mixture and bubbles therein are subjected to a final pressure letdown to the ambient pressure of the flotation vessel.

6. The method of claim 5 wherein between said primary pressure letdown and said discharge location the bubbles formed at the primary pressure letdown stage are sheared to reduce their size.

7. A method for the treatment of a produced water mixture including oil and water to reduce the oil content of the water, the mixture being continuously produced under a relatively high pressure and having a gas naturally present in solution, to reduce the oil content thereof, comprising the steps of:
   dividing the produced water mixture into first and second portions;
   modifying the first portion by reducing the pressure thereof in a single stage;
   delivering the modified first portion to a flotation vessel;
   modifying the said second portion by reducing the pressure thereof to effect a controlled formation of gas bubbles therein of a desired mean size, said gas bubbles being released from solution and caused by cavitation; and
   injecting the modified second portion into the flotation vessel to effect gas flotation treatment of the combined first and second modified portions.

8. The method claimed in claim 7, wherein the step modifying the said second portion of the produced water mixture is carried out by reducing the pressure thereof over at least two stages of pressure reduction.

9. The method claimed in claim 8, wherein one of said last mentioned stages of pressure reduction comprises a bubble shearing operation.

10. Apparatus for use in the treatment of a produced water mixture including oil and water to reduce the oil content of the water, the mixture being continuously produced under a relatively high pressure and having a gas naturally present in solution, to reduce the oil content thereof, comprising:
    a first vessel for holding the produced water mixture under relatively high pressure,
    a flotation vessel,
    first pipe means extending between the first vessel and the flotation vessel,
    first controllable pressure letdown means arranged in said first pipe means,
    second pipe means extending from an influent location upstream of said first controllable pressure letdown means and on a downsteam side of said first vessel to a discharge location in communication with the flotation vessel, and
    second controllable pressure letdown means for establishing at said discharge location a flow of mixture laden with bubbles of said naturally present gas from solution and caused by cavitation for gas flotation treatment of mixture in the flotation vessel arranged in said second pipe means.

11. Apparatus as claimed in claim 10, wherein the first controllable pressure letdown means is a valve means operable to control the level of produced water mixture in said first vessel.

12. Apparatus as claimed in claim 10, wherein the second controllable pressure letdown means comprises a primary pressure letdown valve arranged in the second pipe means upstream of said discharge location, and a final pressure letdown valve arranged downstream of the said primary valve.

13. Apparatus as claimed in claim 12, wherein the final letdown valve is disposed adjacent said discharge location.

14. The apparatus of claim 12 wherein gas bubble shearing means are arranged in said second pipe means between said primary and said final letdown valves.

15. The apparatus of claim 13 wherein said discharge location is disposed within said flotation vessel.

16. The method of claim 1 wherein said discharge location is disposed with said flotation vessel.

* * * * *

UNITED STATES PATENT AND TRADEMARK OFFICE
CERTIFICATE OF CORRECTION

PATENT NO. : 4,889,638

DATED : December 26, 1989

INVENTOR(S) : David B. Rochford et al.

It is certified that error appears in the above-identified patent and that said Letters Patent is hereby corrected as shown below:

The title page showing the illustrative figure should be deleted to appear as per attached title page.

Signed and Sealed this

Eighth Day of January, 1991

*Attest:*

*Attesting Officer*

HARRY F. MANBECK, JR.

*Commissioner of Patents and Trademarks*

United States Patent [19]

Rockford et al.

[11] Patent Number: 4,889,638
[45] Date of Patent: Dec. 26, 1989

[54] AGITATION AND/OR GAS SEPARATION AND DISPERSED GAS FLOTATION

[75] Inventors: David B. Rockford, Ellon; William H. Sutton; Christopher R. Bond, both of Aberdeen; Brian Wilkinson, Methlick, all of Scotland

[73] Assignee: Britoil PLC, Glasgow, Scotland

[21] Appl. No.: 232,565

[22] Filed: Aug. 12, 1988

Related U.S. Application Data

[63] Continuation of Ser. No. 875,162, Jun. 17, 1986, abandoned.

[30] Foreign Application Priority Data

Jun. 19, 1985 [GB] United Kingdom ............ 8515454

[51] Int. Cl.⁴ .......................................... B01D 17/035
[52] U.S. Cl. .................................. 210/703; 210/706; 210/790; 210/218; 210/221.2
[58] Field of Search ............ 210/702, 703, 704, 706, 210/218, 221.1, 221.2, 707, 708, 790, 705; 209/164, 170

[56] References Cited

U.S. PATENT DOCUMENTS

| | | | |
|---|---|---|---|
| 3,446,488 | 5/1969 | Mail et al. | 210/221.2 |
| 3,623,608 | 11/1971 | Waterman | 210/221.2 |
| 3,725,264 | 4/1973 | Wheeler | 210/704 |
| 3,884,803 | 5/1975 | Traylor | 210/704 |
| 4,069,149 | 1/1978 | Jackson | 210/221.2 |
| 4,108,768 | 8/1978 | Sebelik et al. | 210/705 |
| 4,395,337 | 7/1983 | Ciepiela | 210/703 |
| 4,492,636 | 1/1985 | Burke | 210/706 |
| 4,552,651 | 11/1985 | Sandbrook et al. | 209/164 |
| 4,563,283 | 1/1986 | Nicksic | 210/703 |
| 4,627,922 | 12/1986 | Viator et al. | 210/706 |
| 4,752,399 | 6/1988 | Viator et al. | 210/704 |
| 4,790,944 | 12/1988 | Gordon et al. | 210/706 |

FOREIGN PATENT DOCUMENTS 2079618 1/1982 United Kingdom

Primary Examiner—Peter Hruskoci
Assistant Examiner—Christopher Upton
Attorney, Agent, or Firm—Pennie & Edmonds

[57] ABSTRACT

A method of, and apparatus for, separating phases in a polyphase system is described and particularly in separating oil from produced water by the contact of gas bubbles and oil droplets by a dispersed gas flotation technique. A polyphase system is divided into at least two portions. The pressure of one portion is reduced to form bubbles of a gas, and the two portions are then recombined whereby the bubbles in the mixture enhances flotation, and hence separation of the dispersed phase, e.g. oil, from the continuous phase, e.g. water. The invention has particular application in the oil industry and in other fields where efficient separation is required.

16 Claims, 2 Drawing Sheets

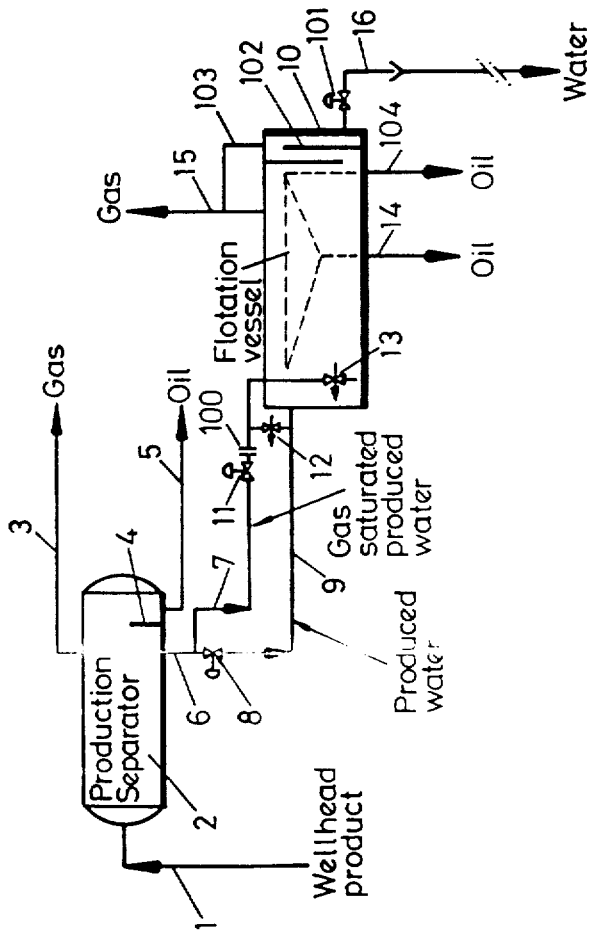

UNITED STATES PATENT AND TRADEMARK OFFICE
CERTIFICATE OF CORRECTION

PATENT NO. : 4,889,638
DATED : December 26, 1989
INVENTOR(S) : David B. Rochford et al.

It is certified that error appears in the above-identified patent and that said Letters Patent is hereby corrected as shown below:

On the front page, please correct the first named inventor from "David B. Rockford" to --David B. Rochford--.

Column 4, line 45, change the word "suppled" to --supplied--.

Column 8, line 65, change the word "with" to --within--.

Signed and Sealed this

Fifth Day of March, 1991

Attest:

HARRY F. MANBECK, JR.

Attesting Officer

Commissioner of Patents and Trademarks